(12) United States Patent
Kunimatsu (10) Patent No.: US 7,393,196 B2
(45) Date of Patent: Jul. 1, 2008

(54) VERTICAL INJECTION MOLDING MACHINE

(75) Inventor: Kiyoshi Kunimatsu, Hyogo (JP)

(73) Assignee: Toyo Machinery & Metal Co., Ltd., Hyogo (JP)

( * ) Notice: Subject to any disclaimer, the term of this patent is extended or adjusted under 35 U.S.C. 154(b) by 213 days.

(21) Appl. No.: 11/347,048

(22) Filed: Feb. 3, 2006

(65) Prior Publication Data

US 2006/0177539 A1  Aug. 10, 2006

(30) Foreign Application Priority Data

Feb. 10, 2005 (JP) ............................. 2005-034664
Jan. 12, 2006 (JP) ............................. 2006-005338

(51) Int. Cl.
  *B29C 45/33* (2006.01)
(52) U.S. Cl. ...................... 425/135; 425/576
(58) Field of Classification Search ............ 425/574, 425/575, 576, 135
  See application file for complete search history.

(56) References Cited

U.S. PATENT DOCUMENTS 5,217,662 A * 6/1993 Yamamura et al. ......... 264/40.1
6,402,504 B1 * 6/2002 Hahn et al. ................. 425/574

FOREIGN PATENT DOCUMENTS

JP  2002-172646  6/2002

* cited by examiner

*Primary Examiner*—Tim Heitbrink
(74) *Attorney, Agent, or Firm*—Fildes & Outland, P.C.

(57) ABSTRACT

The invention provides a vertical injection molding machine capable of stopping the repeatedly revolved turntable at predetermined positions. During operation of a vertical injection molding machine 1 having one or more lower molds 15 mounted on a turntable 14 and an upper mold 16 mounted on an upper retention plate 13, lubricant is periodically fed from a pump 30 to a slide portion S of the revolving turntable 14. Thereby, the slide resistance of the sliding portions S of the turntable 14 is maintained constant, by which the repeatedly revolved turntable 14 is enabled to stop accurately at predetermined positions. Thus, the present machine enables the lower molds 15 which are repeatedly clamped with the upper mold 16 to stop at predetermined positions.

5 Claims, 6 Drawing Sheets

VERTICAL INJECTION MOLDING MACHINE

The present application is based on and claims priority of Japanese patent application No. 2005-034664 filed on Feb. 10, 2005, and Japanese patent application No. 2006-005338 filed on Jan. 12, 2006, the entire contents of which are hereby incorporated by reference.

BACKGROUND OF THE INVENTION

1. Field of the Invention

The present invention relates to a vertical injection molding machine for molding a product by clamping and releasing molds in the vertical direction, and more specifically, relates to a vertical injection molding machine capable of stopping a turntable at predetermined clamping positions and the like for stopping the lower molds revolved with the turntable at predetermined positions.

2. Description of the Related Art

Heretofore, a so-called two-station type vertical injection molding machine has been used, having two lower molds mounted on a turntable which are moved to positions capable of being clamped with a single upper mold by the revolving motion of the turntable, and being clamped in the vertical direction. According to this so-called two-station vertical injection molding machine in which a plurality of lower molds are clamped with an upper mold, a mold product in which a metallic insert component is integrally molded with resin is manufactured by assembling a metallic component for insert-molding to the lower mold positioned on the opposite side from the lower mold being clamped with the upper mold during a mold clamping process, and after completing assembling, revolving the turntable to a predetermined position so as to clamp the lower mold having the metallic component assembled thereto with the upper mold to form a mold product.

Figure 6:
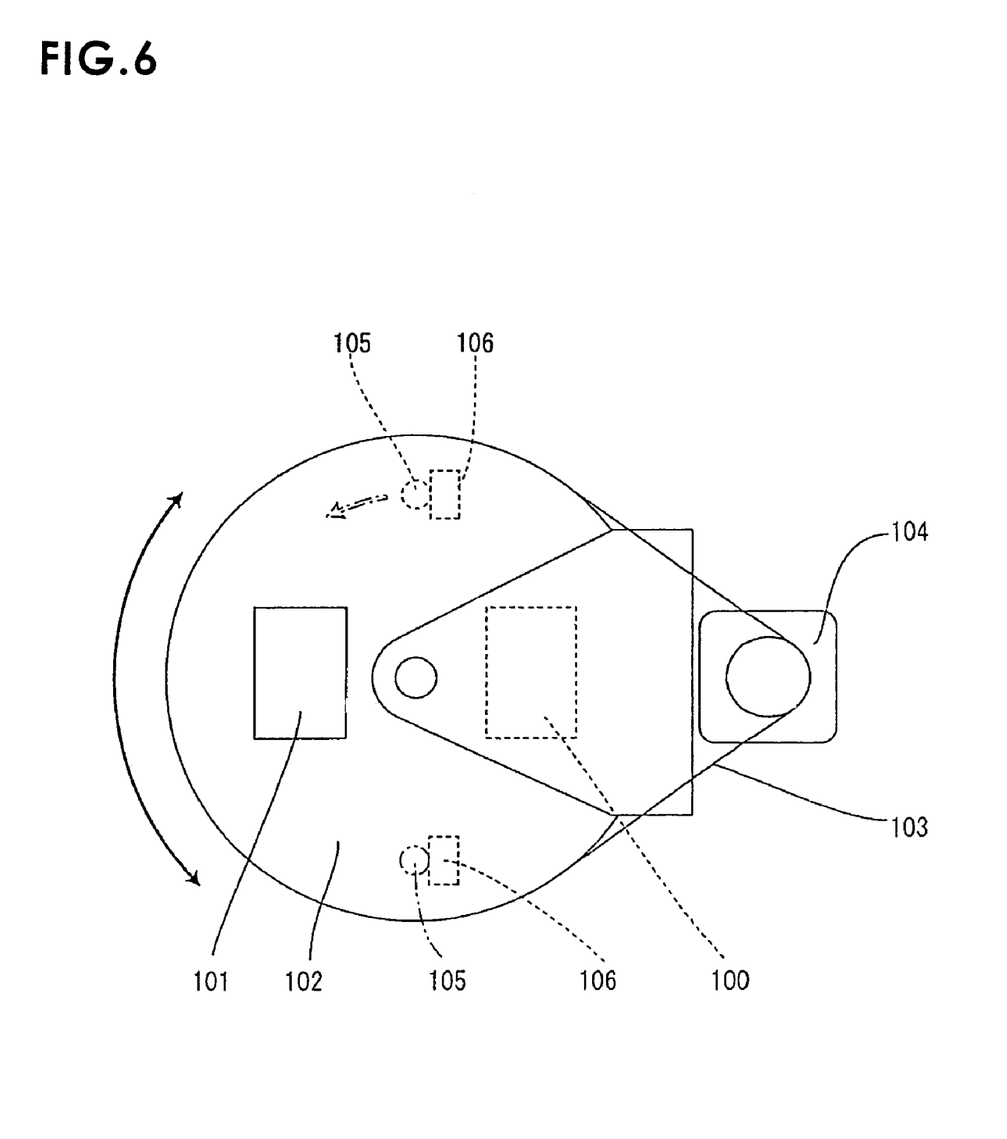
FIG. 6 is an explanatory schematic view showing the relevant portion of a prior art vertical injection molding machine.

In order to produce such molded products in which metallic insert components are integrally molded with resin, it is necessary to assemble the insert component in advance to one of the molds before clamping the molds, so the lower mold being revolved together with the revolving movement of the turntable must be stopped accurately without displacement at a predetermined position capable of being clamped with the upper mold. FIG. 6 is an explanatory view showing the relevant portion of such two-station vertical injection molding machine according to the prior art described above, which will be described with reference to the drawing. According to the illustrated vertical injection molding machine, a turntable 102 on which two lower molds 100 and 101 are mounted is revolved in both directions by a servomotor 104 via a timing belt 103. A stopper pin 105 is integrally formed to a lower surface of the turntable 102 on which the lower molds 100 and 101 are mounted that are clamped with the upper mold not shown. When the turntable is revolved by the operation of the servomotor 104, the stopper pin 105 that moves together with the revolution of the turntable 102 comes in contact with the stopper 106, the state of which is illustrated in FIG. 6, and the lower mold is held at a position capable of being clamped with the upper mold by the stopper pin 105 being pressed against the stopper 106 with predetermined torque until the mold clamping process in which the lower mold 100 and the upper mold are clamped is completed. Japanese Patent Application Laid-Open Publication No. 2002-172646 (patent document 1) discloses a prior art turntable of an injection molding machine having a structure related to the prior art described above.

However, since according to the vertical injection molding machine of FIG. 6 the stopper pin is repeatedly pressed against the stopper for molding by the revolutions of the turntable in both directions, the contact portions of the stopper pin and the stopper are both worn. When the vertical injection molding machine is operated for a long period of time, the components such as the stopper pin used for positioning are worn away, making it difficult to stop the lower molds at predetermined positions. Moreover, if the vertical injection molding machine is continuously operated in the state in which the contact portions are worn away, the molds subjected to clamping are displaced from the predetermined positions, and in some cases, the molds may even be damaged during clamping. Further, since it is necessary to replace worn components such as the stopper pin and the stopper periodically, the replacement of worn components requires much time and work, the operation of the molding machine must be interrupted each time the component is to be replaced, and the manufacturing costs of molded products are increased in vertical injection molding machines producing molded products having insert components made of metal or the like integrally molded with resin.

Further, when the stopper pin collides against the stopper, not only the stopper pin and the stopper but also the drive system of the turntable may be damaged. Therefore, it becomes necessary to stop the turntable without fail immediately before the stopper pin contacts the stopper, which is enabled by taking a large reduction distance before the stop position. However, by increasing the reduction distance, the time required from the starting of the revolution of the turntable to the stopping thereof is increased, and as a result, the overall molding cycle is elongated. Further, as in the case with the two-station vertical injection molding machine having two molds mounted on the turntable as shown in FIG. 6, if the two molds on the turntable are revolved in reciprocating motion for 180 degrees at a time with the revolution of the turntable, the lower molds can be stopped at predetermined positions by having a stopper pin contact a stopper fixed to a base or the like, but in a three-station machine or a four-station machine, the turntable must be revolved for 120 degrees at a time in the former machine and 90 degrees at a time in the latter machine in the same revolving direction, which requires a complex mechanism and control to engage or release the stoppers correspondingly, not only deteriorating reliability but also increasing costs.

Furthermore, according to the example illustrated in FIG. 6, the turntable is stopped by having the stopper pin press against the stopper, but if such structure is not adopted and the revolving turntable is stopped only by the control of the servomotor being the driving source of the turntable, the turntable not only fails to stop within a predetermined range but also the stop position is displaced greatly along with the passing of turntable operation time. Therefore, the inventors of the present invention have conducted various tests, and arrived at the following conclusions regarding the mechanism of dispersion of the stop position of the turntable.

According to test results, when the turntable revolution is reduced and stopped, if the rotational resistance of the turntable is smaller than the rotational inertia, the turntable continues to revolve by inertia resisting against the rotational resistance even when the servomotor is at reduction, so the turntable overruns the predetermined stop position, and therefore, the turntable is stopped at an overrun position even when the servomotor performs a turntable positioning control. On the other hand, if the rotational resistance of the turntable becomes greater than the rotational inertia, the force acts in the opposite direction, and as a result, the turntable tends to stop before the predetermined stop position. Thus, the present inventors have discovered that the rotational resistance of the turntable is influenced by the sliding conditions of the sliding portions of the turntable or the shaft bearing portion, and especially influenced greatly by the sliding conditions of the sliding portions of the turntable having a large sliding resistance. When the sliding portions are fed with a sufficient amount of lubricant and the sliding condition thereof is good, the rotational resistance is small, but when the sliding portions lack lubricant and the sliding condition thereof is deteriorated, the rotational resistance is increased correspondingly. Therefore, the dispersion in the stop position of the turntable is recognized to be caused mainly by the sliding resistance being varied greatly, which is caused by the change in sliding conditions of the sliding portions of the turntable.

SUMMARY OF THE INVENTION

The present invention aims at solving the above-mentioned problems. The object of the present invention is to provide a vertical injection molding machine capable of stopping the repeatedly revolving turntable at predetermined positions by feeding lubricant periodically to the sliding portions of the turntable in order to maintain the slide resistance of the turntable constant.

A first aspect of the present invention relates to a vertical injection molding machine comprising a retention plate having a lower portion to which an upper mold is mounted and a turntable having an upper portion to which a lower mold forming a cavity with the upper mold is mounted, the turntable or the retention plate being moved up and down to clamp and release the upper and lower molds; wherein during operation of the vertical injection molding machine having one or more lower molds mounted on the turntable and the upper mold mounted on the retention plate, lubricant is fed periodically from a lubricant feeding device to sliding portions of the revolving turntable to thereby maintain a substantially constant slide resistance of the sliding portions, so as to enable the repeatedly revolved turntable to stop at predetermined positions, and to enable each of the one or more lower molds being revolved with the turntable to stop at a position capable of being clamped with the upper mold.

According to the first aspect of the present invention, the slide resistance of the sliding portions can be maintained substantially constant, and as a result, during operation of the vertical injection molding machine, the lower molds being clamped repeatedly with the upper mold can be stopped at predetermined positions.

A second aspect of the present invention relates to a vertical injection molding machine according to the first aspect, further comprising a control means for counting the number of times of injection of molten resin into the cavity and controlling the lubricant feeding device based on the counted number of times of injection, wherein the control means controls the lubricant feeding device to activate periodically per every preset number of injections to feed the lubricant to the sliding portions.

According to the second aspect of the invention, the control means drives the lubricant feeding device based on the number of injections of molten resin to the cavity during operation of the vertical injection molding machine to feed the lubricant periodically to the sliding portions, so that even after a long period of operation of the vertical injection molding machine by which the turntable is repeatedly revolved, the lower mold being clamped repeatedly with the upper mold can be stopped at predetermined positions for a long period of time.

A third aspect of the present invention relates to a vertical injection molding machine according to aspects 1 or 2, wherein at least two lower molds can be mounted at equal distances from the center of revolution of the revolving turntable and opposed along a line passing the center of revolution.

According to the third aspect of the invention, the turntable having two lower molds mounted thereto can be revolved for 180 degrees at a time, and the turntable can have the two molds to be positioned at predetermined positions corresponding to the upper mold.

A fourth aspect of the invention relates to a vertical injection molding machine according to aspects 1 or 2, wherein four lower molds can be mounted at equal distances from the center of revolution of the turntable and at equal distances on a cross line passing the center of revolution.

According to the fourth aspect of the invention, the turntable having four lower molds mounted thereto can be revolved sequentially for 90 degrees at a time in the same direction to have the lower molds stop at predetermined positions facing the upper mold. Accordingly, compared to the prior art vertical injection molding machine in which the turntable is revolved for 180 degrees in both directions, the distance of movement of the lower molds according to the present embodiment is reduced to half, by which the time required for the revolving movement of the lower molds is reduced to half, and the production efficiency of the molded products can be enhanced.

A fifth aspect of the present invention relates to a vertical injection molding machine comprising a retention plate having a lower portion to which an upper mold is mounted and a turntable having an upper portion to which a lower mold forming a cavity with the upper mold is mounted, the turntable or the retention plate being moved up and down to clamp and release the upper and lower molds; wherein a plural number of lower molds are mounted on the turntable at uneven arbitrary intervals, and lubricant is fed periodically from a lubricant feeding device to sliding portions of the revolving turntable so that the sliding portions maintain a substantially constant slide resistance by which the lower molds revolved together with the turntable are enabled to stop at arbitrary positions.

According to the fifth aspect of the invention, the sliding resistance of the slide portion can be maintained substantially constant, and the lower molds can be stopped at arbitrary positions.

DETAILED DESCRIPTION OF THE PREFERRED EMBODIMENTS

Now, the preferred embodiments for carrying out the present invention will be described with reference to FIGS. 1 through 5. The technical scope of the present invention is not restricted to the language used in the embodiments, but is extended to the range in which a person skilled in the art could easily substitute based on the present disclosure.

Figure 1:
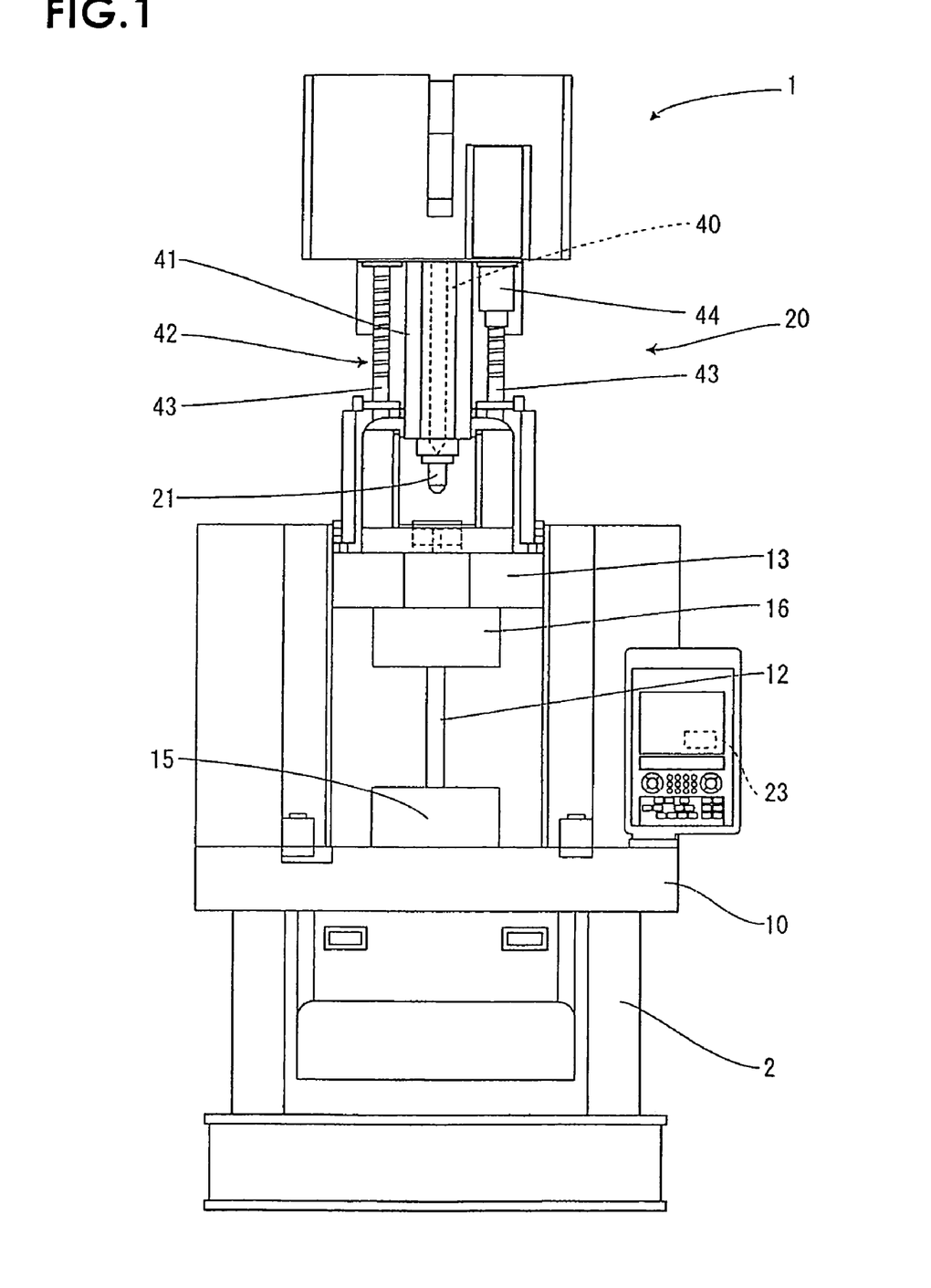
FIG. 1 is a front view of a vertical injection molding machine according to embodiment 1.
Figure 2:
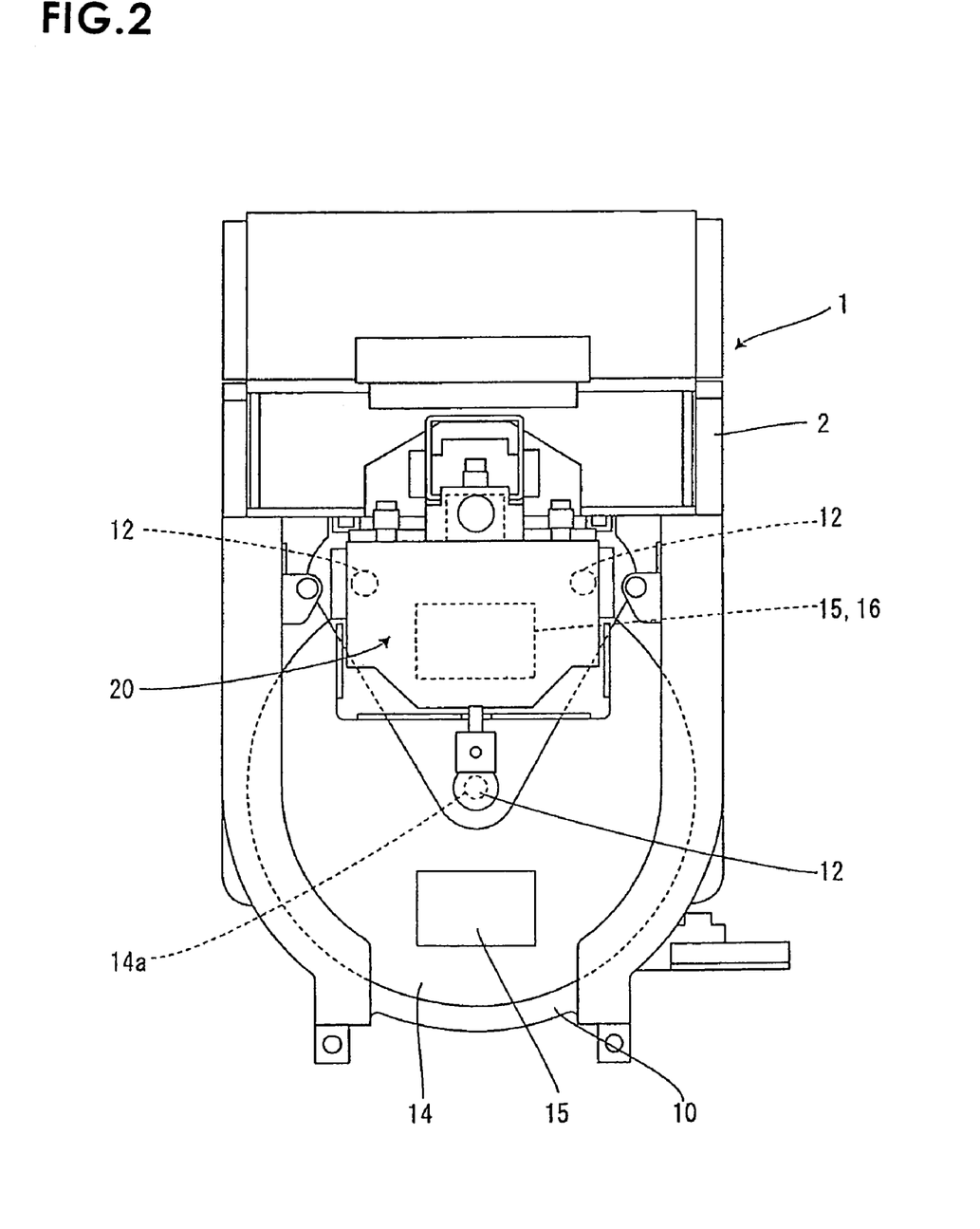
FIG. 2 is a plan view of the vertical injection molding machine according to embodiment 1.
Figure 3:
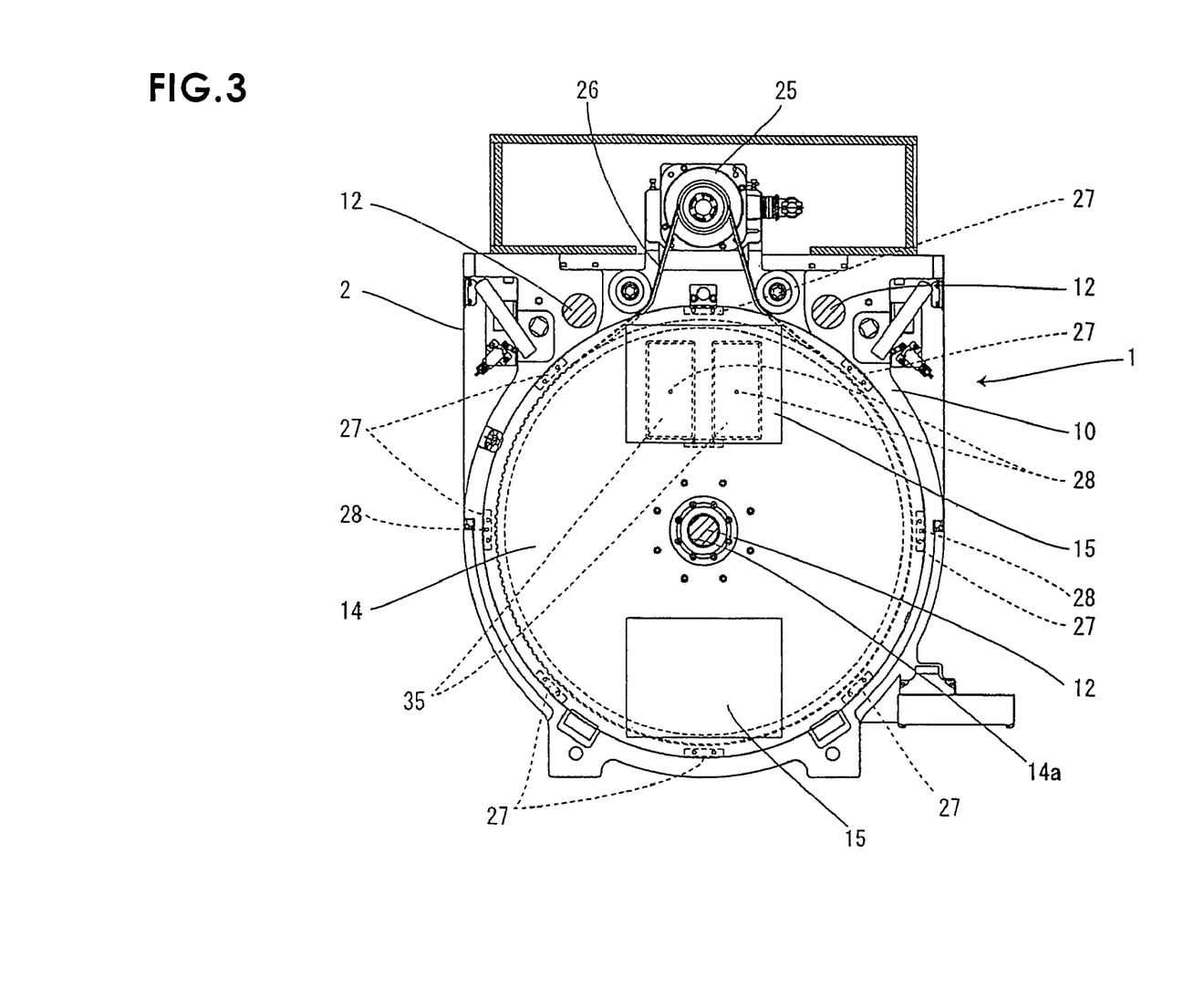
FIG. 3 is a cross-sectional view showing the relevant portion of the vertical injection molding machine according to embodiment 1 from above.
Figure 4:
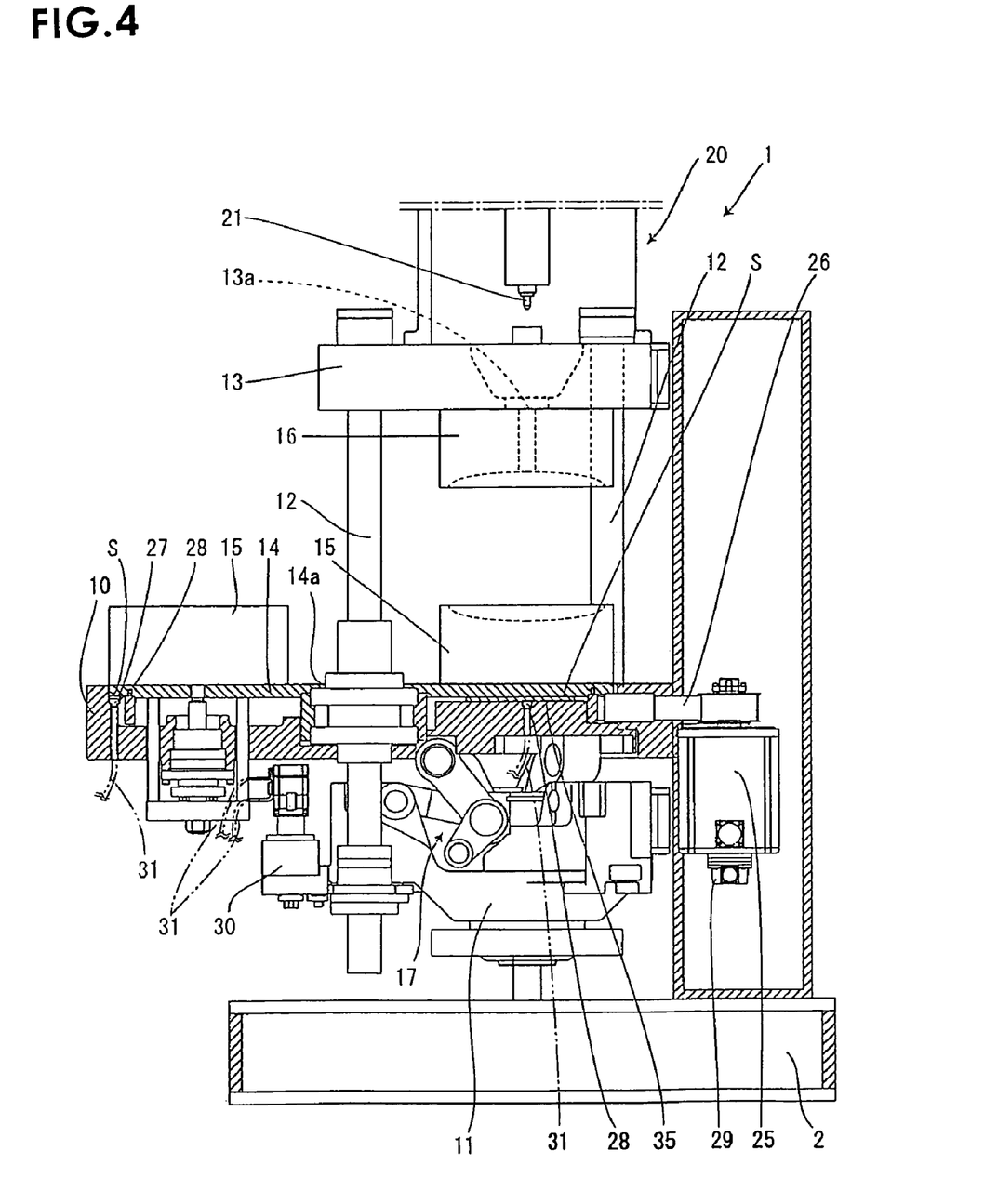
FIG. 4 is across-sectional view showing the relevant portion of the vertical injection molding machine according to embodiment 1.
Figure 5:
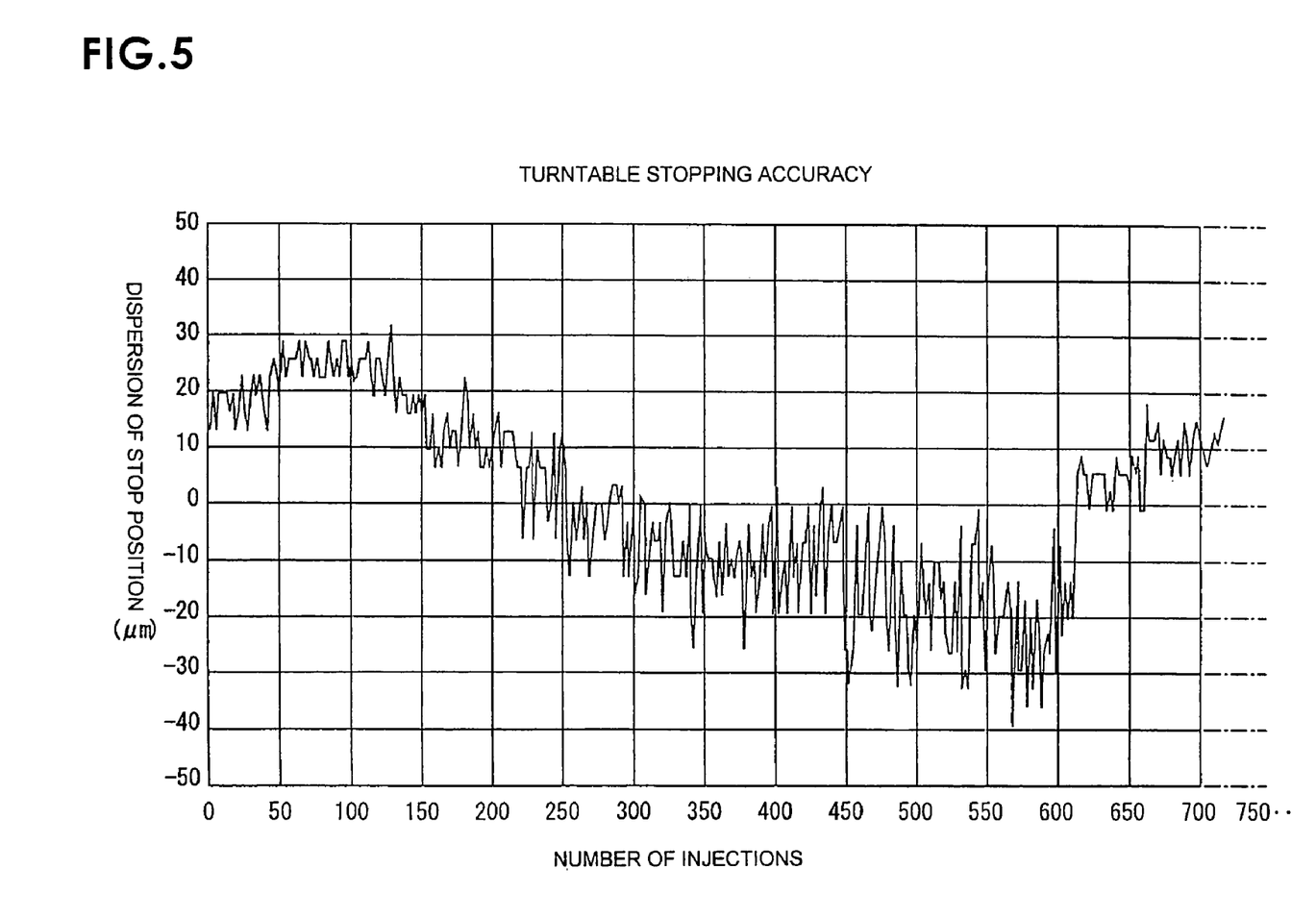
FIG. 5 is a graph showing the stopping accuracy of the turntable according to embodiment 1.

FIG. 1 is a front view of a vertical injection molding machine according to one example of the present invention, FIG. 2 is a plan view of the vertical injection molding machine, FIG. 3 is a cross-sectional view showing the relevant portion of the vertical injection molding machine from above, FIG. 4 is a cross-sectional view showing the relevant portion of the vertical injection molding machine, and FIG. 5 is a graph showing the stopping accuracy of the turn table.

The vertical injection molding machine 1 illustrated in FIG. 1 is for forming a molded member having an insert component such as a metal component integrally molded with resin by clamping and releasing a mold in the vertical direction. An intermediate retention plate 10 is fixed on a machine base 2 of the vertical injection molding machine 1, and an upper retention plate 13 is placed above the intermediate retention plate with a space therebetween, and as shown in FIG. 4, three cylindrical tie bars 12 bridged between the upper retention plate 13 and the lower retention plate 11 are passed through the intermediate retention plate 10, and the upper and lower retention plates 13 and 11 are enabled to move up and down in the vertical direction. Further, the lower retention plate 11 is connected via a toggle link mechanism 17 with the intermediate retention plate 10 fixed to the machine base 2, and by the expansion and contraction of the toggle link mechanism 17, the lower retention plate 11 is moved up and down, along with which the upper retention plate 13 connected to the lower retention plate 11 via tie bars 12 is moved up and down to clamp and release the molds.

As shown in FIG. 3, a revolving disk-shaped turntable 14 is attached to the upper portion of the intermediate retention plate 10, and a cavity is formed by clamping each of the lower molds 15 mounted on the upper portion of the turntable 14 and a single upper mold 16 mounted on the lower portion of the upper retention plate 13. Moreover, the lower retention plate 11 is moved up and down in the vertical direction via the expansion and contraction of the toggle link of the toggle link mechanism 17 mentioned above by a driving means such as a motor not shown, and the upper mold 16 is moved with respect to the lower mold to clamp and release the molds by having the upper retention plate 13 to which the upper mold 16 is attached move up and down.

Further, an injection unit 20 is provided above the upper retention plate 13, and molten resin is fed into the cavity with the tip of an injection nozzle 21 formed to the injection unit pressed against a resin inlet 13a formed to the upper mold 16. According to FIGS. 1 and 4, the injection nozzle 21 of the injection unit 20 is not in contact with the resin inlet 13a, but during injection, a ball screw mechanism 42 converts the rotation of a motor 44 to linear motion via a nut not illustrated engaged to a screw shaft 43 to lower the injection unit 20, by which the tip of the injection nozzle 21 contacts the resin inlet 13a, creating a so-called nozzle-touch status.

Next, the turntable 14 will be described in detail. As shown in FIG. 1, a microcomputer 23 which is a control means drives a servomotor 25 to thereby revolve the turntable 14 that is revolved in connection with the servomotor 25. According to one example of the invention, one tie bar arranged at the front side of the vertical injection molding machine 1 out of the three tie bars 12 arranged vertically is set as the axis or center of revolution of the turntable 14, so that the turntable 14 is revolved. Further, as shown in FIGS. 3 and 4, a hole portion 14a of the turntable 14 is fit to one of the three tie bars 12, and by driving the servomotor 25, the turntable 14 mounted on the intermediate retention plate 10 is slid and revolved via a timing belt 26 suspended between the turntable 14 and the servomotor 25. In further detail, the turntable 14 is slid and revolved by having the lower surface of the turn table 14 contact multiple metal portions 27 formed integrally to an upper surface of the intermediate retention plate 10. Further, the servomotor 25 is equipped with an encoder 29, and the encoder 29 is used to perform feedback-control of the position and speed in order to stop the servomotor 25 at predetermined positions to determine the position of the turntable 14.

Reference number 30 denotes a pump functioning as a lubricant feeding device for feeding lubricant such as grease to a sliding portion S between the metal portions 27 and the turntable 14 and a sliding portion S between a support plate 35 described in detail later and the turntable 14. One end of a pressure-proof tube 31 is connected to the pump 30, and the other or opposite end of the pressure-proof tube 31 is connected to a feed hole 28 formed to the intermediate retention plate 10 by screw-engaging thereon a nipple having a through hole. The microcomputer 23 is controlled to feed the lubricant from the pump 30 via the pressure-proof tube 31 to the sliding portions S of the turntable 14 periodically at predetermined intervals, such as per every 600 shots of resin injection to the cavity. Thus, the slide friction of the sliding portions S can be maintained substantially at a constant level, so that the multiple lower molds 15 mounted on the turntable 14 can be sequentially stopped at predetermined positions under and facing the upper mold 16 in a clampable manner when the vertical injection molding machine 1 is operated continuously.

Furthermore, as shown in FIG. 4, a support plate 35 is attached integrally to the intermediate retention plate 10 at the lower side of the turntable 14 on which the lower mold 15 is attached, and when the turntable 14 is revolved, the support plate 35 of the intermediate retention plate 10 slid with the turntable 14 provides sufficient supporting force to endure the mold clamping force applied when the upper mold 16 is lowered and clamped onto the lower mold 15.

During measurement of resin for the injection unit 20, a screw 40 is rotated in the predetermined direction to mix and plasticize the resin material fed to the upper base-side end of a heating cylinder 41, and the resin is sent into the injection nozzle 21 placed at the leading end of the screw 40 via the screwing action of the screw 40. Along with the pooling of molten resin at the leading end of the screw 40, the screw 40 is retreated while having its back pressure controlled, and when a predetermined amount of molten resin is pooled at the leading end of the screw 40, the rotation of the screw 40 is stopped.

Upon injecting molten resin into the cavity during operation of the vertical injection molding machine 1, a screw 40 is moved forward by converting the rotation of a screw shaft to a linear movement via the screw shaft of a ball screw mechanism not shown and a nut body engaged therewith not shown, and by this movement, the molten resin pooled at the leading end of the screw 40 is injected and filled into the cavity defined by the upper mold 16 and lower mold 15.

In the two-station vertical injection molding machine 1 according to the present embodiment having an upper mold 16 attached to the upper retention plate 13 and two lower molds 15 to be clamped with the upper mold 16 mounted on the turntable 14, the lower molds 15 are mounted on the turntable 14 along a line in the direction of the diameter passing the center of revolution of the turntable 14, as shown in FIG. 3. Further, the two lower molds 15 are arranged at even angular intervals of 180 degrees on the turntable 14 with respect to one upper mold 16, and when the clamping between the upper mold 16 and one lower mold 15 is released, the microcomputer 23 controls the servomotor 25 to rotate the turntable 14 for 180 degrees so that the other lower mold 15 on the turntable 14 faces the upper mold 16, and the lower mold 15 and the upper mold 16 are clamped again. Then, molten resin is injected through the injection nozzle 21 into the cavity, and the resin inside the cavity is cooled. Metal components or the like for insert molding are assembled by robots or manually by operators to the other lower mold 15 arranged on the 180-degree opposite side of the lower mold 15 being clamped, and by repeating this process, a molded body having an insert component integrally molded with resin is formed.

Next, the stopping accuracy of the revolving turntable will be described. FIG. 5 is a graph showing the stopping accuracy of the turntable illustrating the relationship between the stop position of the turntable and the number of injections. As described earlier, while the vertical injection molding machine 1 is in operation to form mold products continuously by repeatedly injecting molten resin into cavities, the microcomputer 23 controlled the operation of the pump 30 to supply lubricant to the sliding portions S between the plural metal portions 27 disposed integrally on the upper surface of the intermediate retention plate 10, the support plate 35 and the turntable 14 once per every 600 shots of injection of molten resin, and the result illustrated in the graph was thus obtained. In this graph, the predetermined stopping position of the turntable 14 set in advance is shown as "0" on the vertical axis, the dispersion of stopping position which is the difference between the predetermined stopping position and the actual stopping position is represented by a positive numeral if the stopping position of the turntable 14 is on the overrun side and by a negative numeral if the stopping position is on the short side, and the number of injections of molten resin is represented in the horizontal axis. By supplying a predetermined amount of lubricant to the sliding portions S from the pump 30 periodically per every 600 shots of injection, the slide resistance of the sliding portions S of the continuously operating vertical injection molding machine 1 can be maintained substantially constantly, and the revolving turntable 14 can be stopped without fail within the very limited predetermined allowable range of dispersion of the stopping position, which is plus or minus 50 micrometers, and actually, less than plus or minus 40 micrometers. Accordingly, the multiple lower molds 15 mounted at even intervals of 180 degrees, for example, on the turntable 14 can be stopped without fail at the predetermined position facing the upper mold 16, and the molded products having insert components integrally formed there to can be produced efficiently. Thus, the present embodiment enables to prevent the deterioration of production efficiency caused by stopping the operation of the molding machine for maintenance, which was necessary according to the prior art machine.

The example described above relates to a two-station type vertical injection molding machine 1 in which two lower molds 15 are mounted on the turntable 14, but the same effects can be achieved by using a single station machine in which a single lower mold 15 is mounted on the turntable 14, or a four-station machine in which four lower molds 15 are mounted in a cross-shape on the turntable 14 at 90-degree intervals. Since the prior art system of the vertical injection molding machine is not adopted, in which the turntable is turned in both directions for 180 degrees and a stopper pin is pressed against a stopper to stop the lower mold at a predetermined position corresponding to the upper mold, other various examples are possible, such as moving the four lower molds 15 mounted on the turntable 14 to mold clamping positions by turning the turntable in a single direction for 90 degrees at a time, by which the same effect as the previous embodiment are achieved.

According to the above-mentioned vertical injection molding machine 1, the upper retention plate 13 having the upper mold 16 mounted thereto is moved down and up to clamp and release the mold, but if necessary, the intermediate retention plate 10 can be moved up and down to clamp and release the mold, and the assembling timing of the insert components can be determined arbitrarily.

Further, the microcomputer 23 can control the feeding of lubricant not based on the number of injection such as per 600 shots, but based on predetermined time intervals during the operation time of the injection molding machine computed by the microcomputer. Even according to this example, the slide resistance during operation can be maintained constantly.

As explained, according to the vertical injection molding machine 1 of the present invention, lubricant is supplied periodically to the sliding portions S of the turntable 14 to maintain a substantially constant sliding resistance of the turntable, and as a result, the turntable 14 being revolved repeatedly can be stopped at predetermined positions. Thus, according to a vertical injection molding machine 1 comprising an upper retention plate 13 having an upper mold 16 attached to the lower portion thereof and a turntable 14 having a lower mold 15 mounted to the upper portion thereof that form a cavity with the upper mold 16, wherein the molds are clamped and released by moving either the turntable 14 or the upper retention plate 13 up and down, the turntable 14 has one or more lower molds 15 mounted thereto and the upper retention plate 13 has one upper mold 16 attached thereto. During operation of this vertical injection molding machine 1, lubricant is supplied periodically from a pump 30 acting as a lubricant supply device to sliding portions S of the turntable 14 being revolved, so as to maintain a substantially constant slide resistance of the sliding portions S, in order to enable the repeatedly revolved turntable 14 to stop at predetermined positions and to stop the one or more lower molds 15 revolved together with the turntable 14 at the mold clamping position corresponding to the upper mold 16. Thus, the slide resistance of the sliding portions S of the turntable 14 can be maintained substantially constantly, and the lower molds 15 clamped repeatedly with the upper mold 16 during operation of the vertical injection molding machine 1 can be stopped at predetermined positions. Thus, the prior art method of using a stopper pin revolved together with the rotating turntable that contacts a fixed stopper and presses against the stopper to hold the lower mold to a predetermined stopping position for mold clamping is no longer adopted, and the work load related to replacing the worn stopper pin and stopper no longer becomes necessary. Therefore, the vertical injection molding machine 1 according to the present invention enables to reduce the load of maintenance operation and to improve the production efficiency upon manufacturing molded products with integral insert components by operating continuously for a long period of time.

Furthermore, a microcomputer 23 is provided as a means for controlling the operation of the pump 30 functioning as a lubricant feeding device by counting the number of injections of molten resin into the cavity, and based on the predetermined number of injections, such as per every 600 shots, the microcomputer 23 operates the pump 30 periodically to supply the lubricant to the sliding portions S. Thus, based on the number of injections of molten resin to the cavity during operation of the vertical injection molding machine 1, the microcomputer 23 controls the pump 30 to periodically supply lubricant to the sliding portions S. Therefore, even after the vertical injection molding machine 1 has been operated for a long period of time and the turntable 14 is repeatedly revolved, the lower molds 15 clamped repeatedly with the upper mold 16 can be accurately stopped at predetermined positions for a long period of time.

Moreover, as illustrated in FIG. 3, since at least two lower molds 15 can be mounted at even intervals with respect to the center of revolution of the turntable 14 along a line passing the center thereof, when two lower molds 15 are attached to the turntable 14, the turntable is revolved for 180 degrees at a time so as to enable each of the two lower molds to be stopped at the predetermined position with respect to the upper mold 16. Accordingly, unlike the prior art method of stopping the turntable in which the wear of stopper and other components causes the stopping position to be varied, the present invention can have the molds clamped accurately.

When four lower molds 15 are disposed at even intervals of 90 degrees with respect to the center of revolution of the turntable 14 and on a crossing line passing the center thereof, the turntable 14 with the four lower molds 15 is revolved in a certain direction and for 90 degrees at a time to have each lower mold 15 stop at predetermined positions corresponding to the upper mold 16. Therefore, in comparison to the prior art vertical injection molding machine in which the turntable is rotated for 180 degrees in both directions, the distance of movement of the lower molds 15 according to the present invention can be reduced to half, so that the moving time of the lower molds 15 can be cut down to half, and thus the production efficiency of the molded products having insert components integrally molded thereto can be improved, and the manufacturing cost of the molded products can be suppressed.

Further, even when multiple lower molds 15 are mounted on the turntable 14 at even intervals from the center of revolution of the turntable 14 but at uneven arbitrary angular intervals with their center corresponding to the center of revolution, the lubricant being supplied periodically from the pump 30 to the sliding portions S of the rotating turntable 14 enables the slide resistance of the sliding portions S to be maintained substantially at a constant level and thus enables the lower molds 15 revolved together with the turntable 14 to be stopped at arbitrary positions.

A preferred embodiment of the present invention has been described in detail above, but the embodiment is not intended to restrict the range of the present invention, and various modifications can be made within the scope of the present invention. For example, the present embodiment adopts a two-station-type vertical injection molding machine 1 as illustrated in FIGS. 1 through 5, but the present invention can be applied to various types of vertical injection molding machines other than the two station machine, such as the four station machine mentioned earlier, or a three station machine in which three lower molds are mounted at 120-degree intervals on the turntable and the turntable is revolved sequentially in a certain direction for 120 degrees at a time, or a multiple station machine such as a five station machine or a six station machine having molds arranged at arbitrary uneven angles.

The effects of the present invention are as follows.

The first aspect of the present invention relates to a vertical injection molding machine comprising a retention plate having a lower portion to which an upper mold is mounted and a turntable having an upper portion to which a lower mold forming a cavity with the upper mold is mounted, the turntable or the retention plate being moved up and down to clamp and release the upper and lower molds; wherein during operation of the vertical injection molding machine having one or more lower molds mounted on the turntable and the upper mold mounted on the retention plate, lubricant is fed periodically from a lubricant feeding device to sliding portions of the revolving turntable to thereby maintain a substantially constant slide resistance of the sliding portions, so as to enable the repeatedly revolved turntable to stop at predetermined positions, and to enable one lower mold or each of the lower molds being revolved with the turntable to stop at positions capable of being clamped with the upper mold. According to this arrangement, the lower molds being repeatedly clamped with the upper mold during operation of the vertical injection molding machine can be stopped at predetermined positions without being displaced. Since the present arrangement does not adopt the prior art method of using a stopper pin moved in revolving motion with the revolving turntable that is made to contact and be pressed against the stopper in order to maintain the lower molds at a predetermined stop position capable of being clamped with the upper mold, there are no wear components such as the stopper pin and stoppers that must be replaced. Thus, the present vertical injection molding machine reduces the work load related to maintenance operations, and improves the production efficiency.

The second aspect of the present invention relates to the vertical injection molding machine according to the first aspect, further comprising a control means for counting the number of times of injection of molten resin into the cavity and for controlling the lubricant feeding device based on the counted number of times of injection, wherein the control means controls the lubricant feeding device to activate periodically per every preset number of injections to feed the lubricant to the sliding portions. According to this arrangement, the vertical injection molding machine can be operated continuously for a long period of time.

The third aspect of the present invention relates to the vertical injection molding machine according to the first two aspects, wherein at least two lower molds can be mounted at equal distances from the center of revolution of the revolving turntable and opposed along a line passing said center of revolution. According to this arrangement, two lower molds can be mounted on the turntable revolving for 180 degrees at a time to move and stop the lower molds at predetermined positions with respect to the upper mold during a long period of machine operation. Thus, unlike the prior art method for stopping the turntable in which the wear of components such as the stopper causes the molds to be displaced, the present machine can position the molds accurately.

The fourth aspect of the present invention relates to the vertical injection molding machine according to the first two aspects, wherein four lower molds can be mounted at equal distances from the center of revolution of the turntable and at equal distances on across line passing the center of revolution. Thus, instead of revolving the turntable in both directions for 180 degrees at a time, the prevent machine revolves the turntable for 90 degrees at a time to have the four lower molds sequentially clamped with the upper mold, which enable the moving distance of the lower molds to be reduced and thus the moving time of the lower molds to be shortened, improving the production efficiency of the molded products and reducing the production costs.

The fifth aspect of the present invention relates to a vertical injection molding machine comprising a retention plate having a lower portion to which an upper mold is mounted and a turntable having an upper portion to which a lower mold forming a cavity with the upper mold is mounted, the turntable or the retention plate being moved up and down to clamp and release the upper and lower molds; wherein a plural number of lower molds are mounted on the turntable at uneven arbitrary intervals, and lubricant is fed periodically from a lubricant feeding device to sliding portions of the revolving turntable so that the sliding portions maintain a substantially constant slide resistance by which the lower molds revolved together with the turntable are enabled to stop at arbitrary positions. Thus, unlike the prior art vertical injection molding machine in which the stopper pin is pressed against the stopper to have the lower mold stop at the stop position, the present machine reduces the maintenance work load since it does not require replacement of wear components such as the stopper pin and the stopper.

What is claimed is:

1. A vertical injection molding machine comprising:
    a retention plate having a lower portion to which an upper mold is mounted;
    a turntable having an upper portion to which a lower mold forming a cavity with the upper mold is mounted, the turntable or the retention plate being moved up and down to clamp and release the upper and lower molds; and
    a control that during operation of the vertical injection molding machine having one or more lower molds mounted on the turntable and the upper mold mounted on the retention plate, controls lubricant fed from a lubricant feeding device to a sliding portion of the revolving turntable to maintain a substantially constant slide resistance of the sliding portion, so as to enable the repeatedly revolved turntable to stop at predetermined positions, and to enable each of the one or more lower molds being revolved with the turntable to stop at positions capable of being clamped with the upper mold.

2. The vertical injection molding machine according to claim 1, further comprising a control means for counting the number of times of injection of molten resin into the cavity and controlling the lubricant feeding device based on the counted number of times of injection, wherein the control means controls the lubricant feeding device to activate periodically per every preset number of injections to feed the lubricant to the sliding portion.

3. The vertical injection molding machine according to claim 1, wherein at least two lower molds can be mounted at equal distances from the center of revolution of the revolving turntable and opposed along a line passing the center of revolution.

4. The vertical injection molding machine according to claim 1, wherein four lower molds can be mounted at equal distances from the center of revolution of the turntable and on a cross line passing the center of revolution.

5. A vertical injection molding machine comprising:
    a retention plate having a lower portion to which an upper mold is mounted;
    a turntable having an upper portion to which a lower mold forming a cavity with the upper mold is mounted, the turntable or the retention plate being moved up and down to clamp and release the upper and lower molds;
    a plural number of lower molds are mounted on the turntable at uneven arbitrary intervals; and
    a control that feeds lubricant from a lubricant feeding device to a sliding portion of the revolving turntable so that the sliding portion maintains a substantially constant slide resistance by which the lower molds being revolved with the turntable are enabled to stop at predetermined positions.

* * * * *